(12) United States Patent
Tsitron

(10) Patent No.: US 8,546,971 B2
(45) Date of Patent: Oct. 1, 2013

(54) APPARATUS FOR GENERATING ELECTRICITY FROM WIND POWER

(76) Inventor: Ilya Tsitron, Brooklyn, NY (US)

( * ) Notice: Subject to any disclaimer, the term of this patent is extended or adjusted under 35 U.S.C. 154(b) by 13 days.

(21) Appl. No.: 13/337,157

(22) Filed: Dec. 26, 2011

(65) Prior Publication Data

US 2012/0091727 A1 Apr. 19, 2012

(51) Int. Cl.
*F03D 9/00* (2006.01)
*H02P 9/04* (2006.01)

(52) U.S. Cl.
USPC .......................................................... 290/55

(58) Field of Classification Search
USPC ......................................... 290/54, 55, 42–44
See application file for complete search history.

(56) References Cited

U.S. PATENT DOCUMENTS

| | | | | |
|---|---|---|---|---|
| 4,122,675 A | * | 10/1978 | Polyak | 327/28 |
| 4,452,046 A | * | 6/1984 | Valentin | 60/641.11 |
| 4,715,776 A | * | 12/1987 | Benesh | 415/4.1 |
| 7,172,386 B2 | * | 2/2007 | Truong et al. | 415/4.1 |
| 2010/0001532 A1 | * | 1/2010 | Grumazescu | 290/55 |

* cited by examiner

*Primary Examiner* — Javaid Nasri

(57) ABSTRACT

An apparatus for generating electricity from wind power includes a turbine, a generator connected with the turbine and generating electricity in response to rotation of the turbine's impeller around a substantially upright axis under an action of wind, a wind guiding device guiding wind substantially upwardly toward the turbine, wherein the wind guiding device has a guiding element which is inclined relative to a vertical plane so as to direct the wind toward the turbine.

20 Claims, 19 Drawing Sheets

APPARATUS FOR GENERATING ELECTRICITY FROM WIND POWER

BACKGROUND OF THE INVENTION

The present invention relates to apparatuses for generating electricity from wind power.

Apparatuses for generating electricity from wind power such as windmills are developed in many variations and widely used nowadays. The existing apparatuses have low efficiency since they collect only a small fraction of wind energy hitting them. They are expensive to build and service, are not reliable, require a lot of space and cannot be placed near or onto buildings. They must be very tall and placed in very windy locations to be economically feasible. They are not appealing to many people, and not safe for birds and other flying objects. It is believed that the existing apparatuses of this type can be further improved.

SUMMARY OF THE INVENTION

Accordingly, it is an object of the present invention to provide an apparatus for generating electricity from wind power, which is a further improvement of existing apparatuses.

In keeping with these objects, one feature of the present invention resides, briefly stated, in an apparatus for generating electricity from wind power, comprising a turbine; a generator connected with said turbine which generates electricity in response to rotation of turbine's impeller around a substantially upright axis under the action of wind, and a wind guiding device that efficiently redirects wind substantially vertically upwardly toward said turbine, wherein said wind guiding device has a main wind guiding element which is inclined relative to a vertical plane so as to direct wind toward said turbine.

In accordance with a further feature of the present invention, the said apparatus has at least one substantially upright side wall, forming a wind directing element.

In accordance with a further feature of the present invention said wind guiding device is an upwardly inclined wall.

In accordance with a further feature of the present invention, said device has a plurality of substantially upright spaced plates, which are inclined relative to a horizontal plane thus forming a plurality of additional inclined wind guiding elements.

In accordance with a further feature of the present invention, the apparatus has at least one wall attachable to an outside structure.

In accordance with a further feature of the present invention, the apparatus is attached to a roof of a building, formed as a roof of a building, or formed as part of a building.

In accordance with a further feature of the present invention, said device has a plurality of wind channels formed by the wind directing elements and the main wind guiding elements, and a plurality of turbines each associated with each of said wind channels.

In accordance with a further feature of the present invention, said device has a plurality of wind channels, and wherein all said wind channels associated with a single turbine that has a single impeller rotatable by wind moving through all said wind channels.

In accordance with a further feature of the present invention, a casing is provided having a substantially vertical axis and surrounding said turbine.

In accordance with a further feature of the present invention, a wind-guiding device of the apparatus includes further wind guiding elements and openings between them.

In accordance with a further feature of the present invention, multiple of said apparatuses can be vertically placed one on top of another.

In accordance with a further feature of the present invention, said additional inclined wind guiding elements are provided with solar cells.

In accordance with a further feature of the present invention, the apparatus has a floatable structure, and means for attaching a lower side of the apparatus to said floatable structure.

In accordance with a further feature of the present invention, a bird-protecting element is provided.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
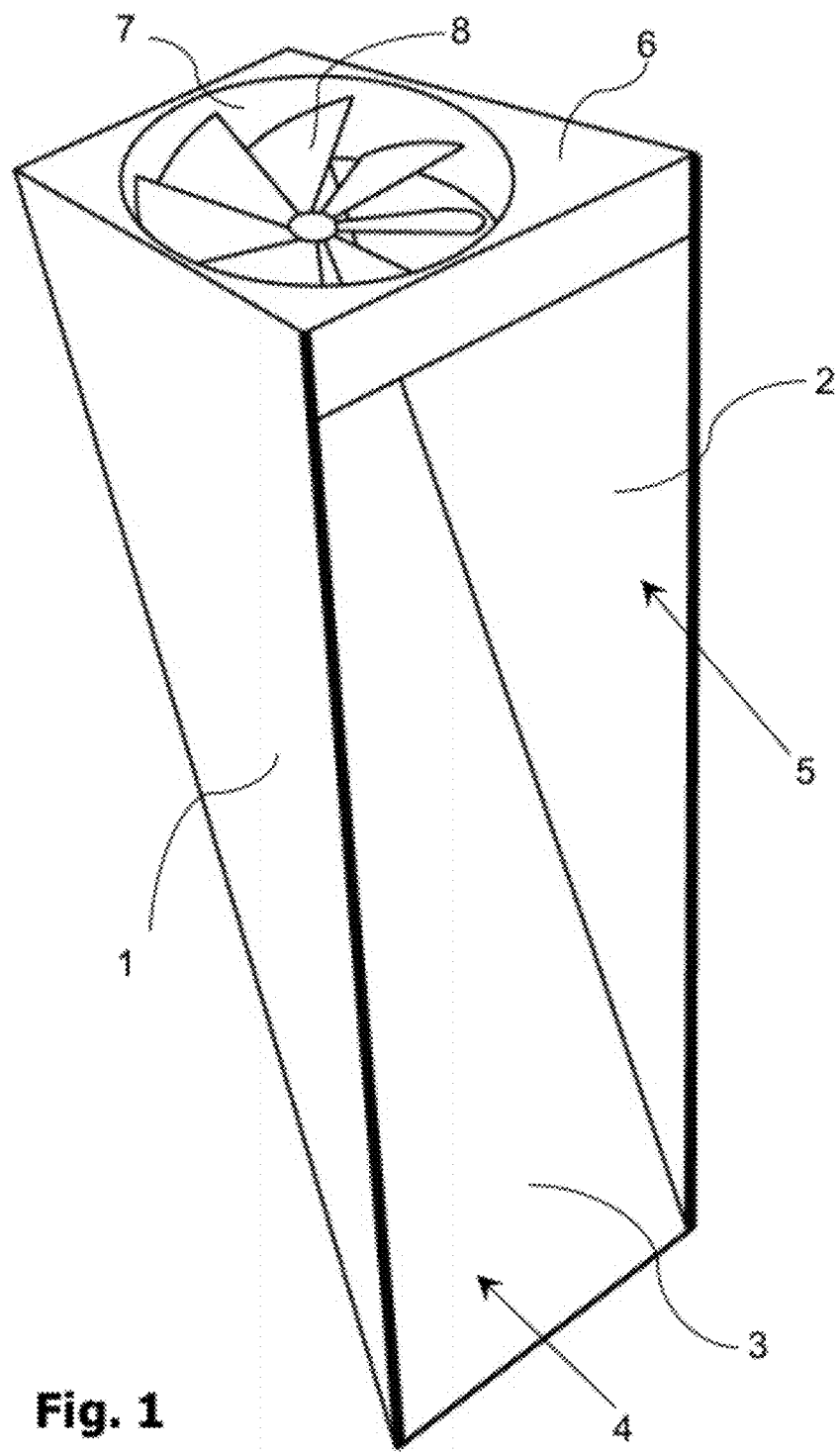
FIG. 1 is a view showing an apparatus for generating electricity from wind power in accordance with one embodiment of the present invention, having wind directing elements and a main wind guiding element.

An apparatus for generating electricity from wind power shown in FIG. 1 has three side walls 1, 2, and 3. The side walls 1, 2 extend substantially upright and form wind directing elements 5, while the side wall 3 is inclined toward a vertical plane and forms a main wind guiding element 4. The apparatus further has an upper wall 6 in which a turbine 7 having an impeller 8 is located. When the wind collides with the apparatus shown in FIG. 1, the wind directing elements 5 direct the wind into the interior of the apparatus, and the main wind-guiding element 4 guides the wind upwardly toward the turbine 7, rotating its impeller 8 around a substantially upright axis. A shaft of the turbine 7 is connected, in a not shown manner, with a shaft of a generator, which rotates so that the generator produces electricity.

Figure 2:
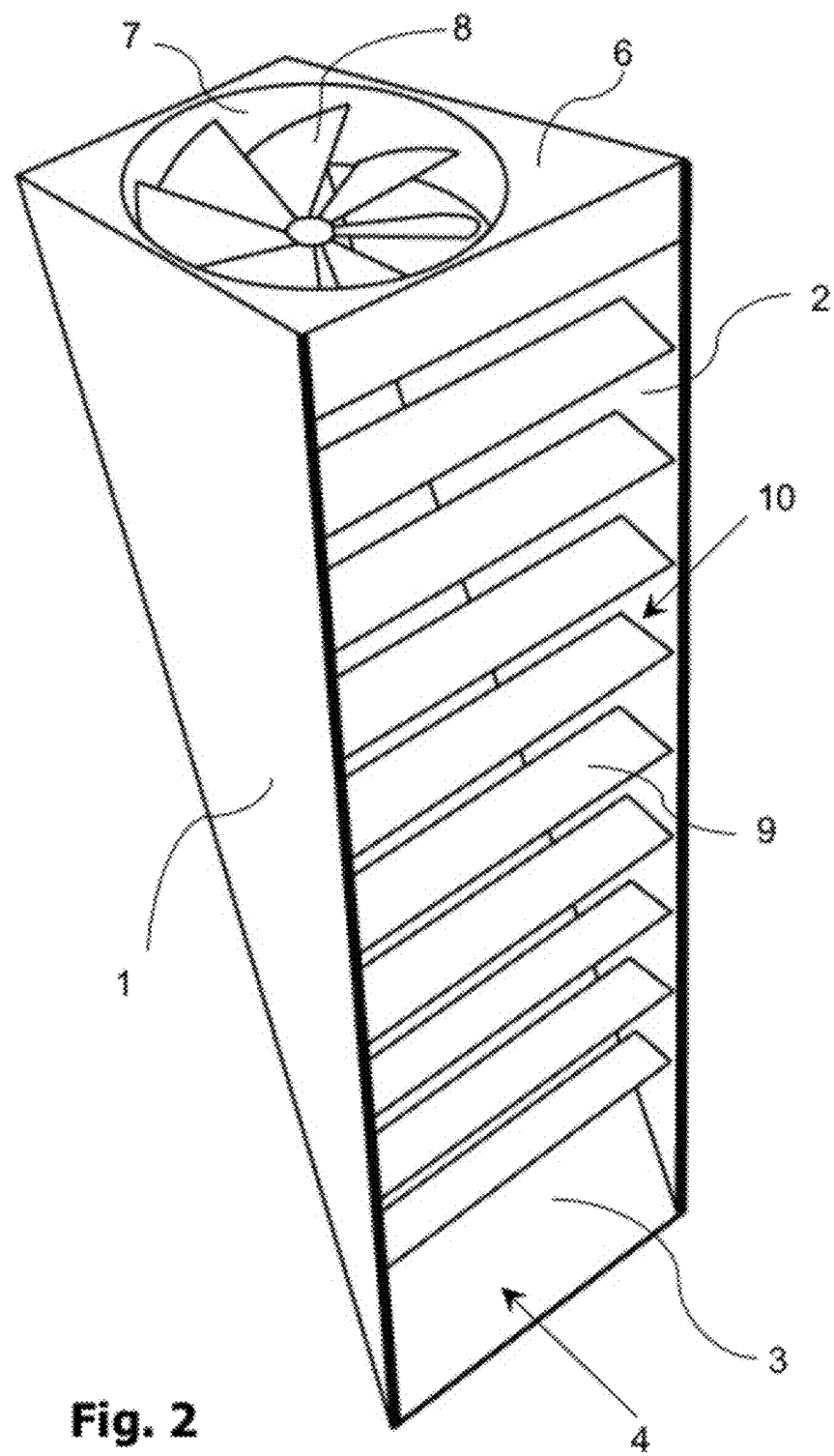
FIG. 2 is a view substantially corresponding to the view of FIG. 1 but showing the inventive apparatus with a plurality of additional inclined wind guiding elements.

The apparatus shown in FIG. 2 substantially corresponds to the apparatus of FIG. 1. However, it is additionally provided with a plurality of substantially upright spaced plates 9 that are inclined relative to a horizontal plane and extend between the side walls 1 and 2 forming additional inclined wind guiding elements 10. When the wind collides with the apparatus shown in FIG. 2, it is first redirected by the additional guiding elements 10 into the interior of the apparatus substantially upwardly, and directed by the wind directing elements 5 towards the main wind-guiding element 4, which guides the wind upwardly toward the turbine 7 to rotate its impeller 8.

Figure 3:
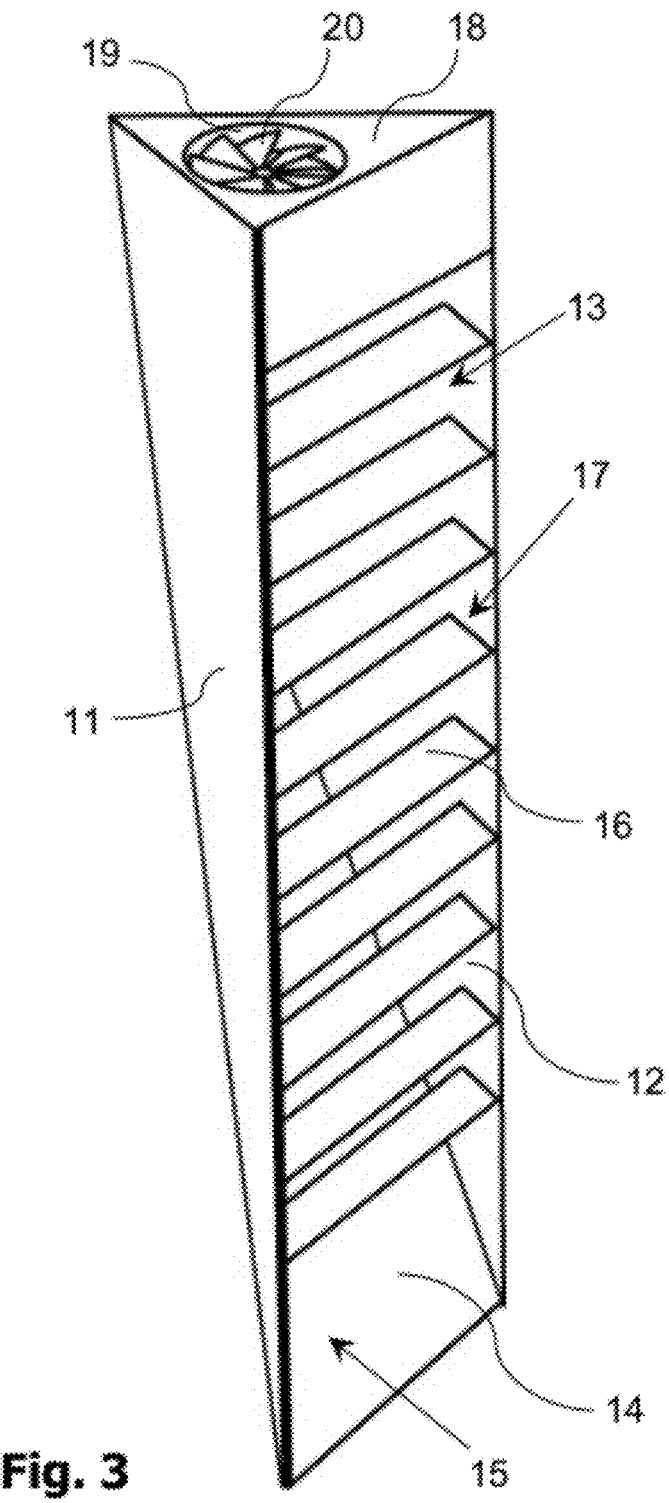
FIG. 3 is a view showing the inventive apparatus having a shape which is different than the shape of the apparatus of FIG. 2.

The apparatus shown in FIG. 3 substantially corresponds to the apparatus shown in FIG. 2. It also has two substantially upright side walls 11 and 12 forming a wind directing element 13, and a third wall 14 which is inclined to a vertical plane and forms a main wind guiding element 15, a plurality of arranged substantially upright arranged plates 16 extending between walls 11 and 12 and forming additional inclined wind guiding elements 17, and an upper wall 18 in which a turbine 19 is arranged and has an impeller 20. However, in the apparatus shown in the embodiment of FIG. 3 the upper wall 18 does not have four sides as in the embodiment of FIG. 2, but it only has three sides and therefore the walls 11, 12, and 14 are connected with one another in a different manner.

In the embodiments shown in FIGS. 1, 2, and 3, the walls 1, 2, 3, 6 and 11, 12, 14 and 18 can be connected with one another by known means such as gluing, welding, bolting, etc. or can be formed of one piece with one another and made of one-piece material. The same is true with respect to the inclined plates 9 and 16 which can be either connected to the side walls or formed of one piece with them.

Figure 4:
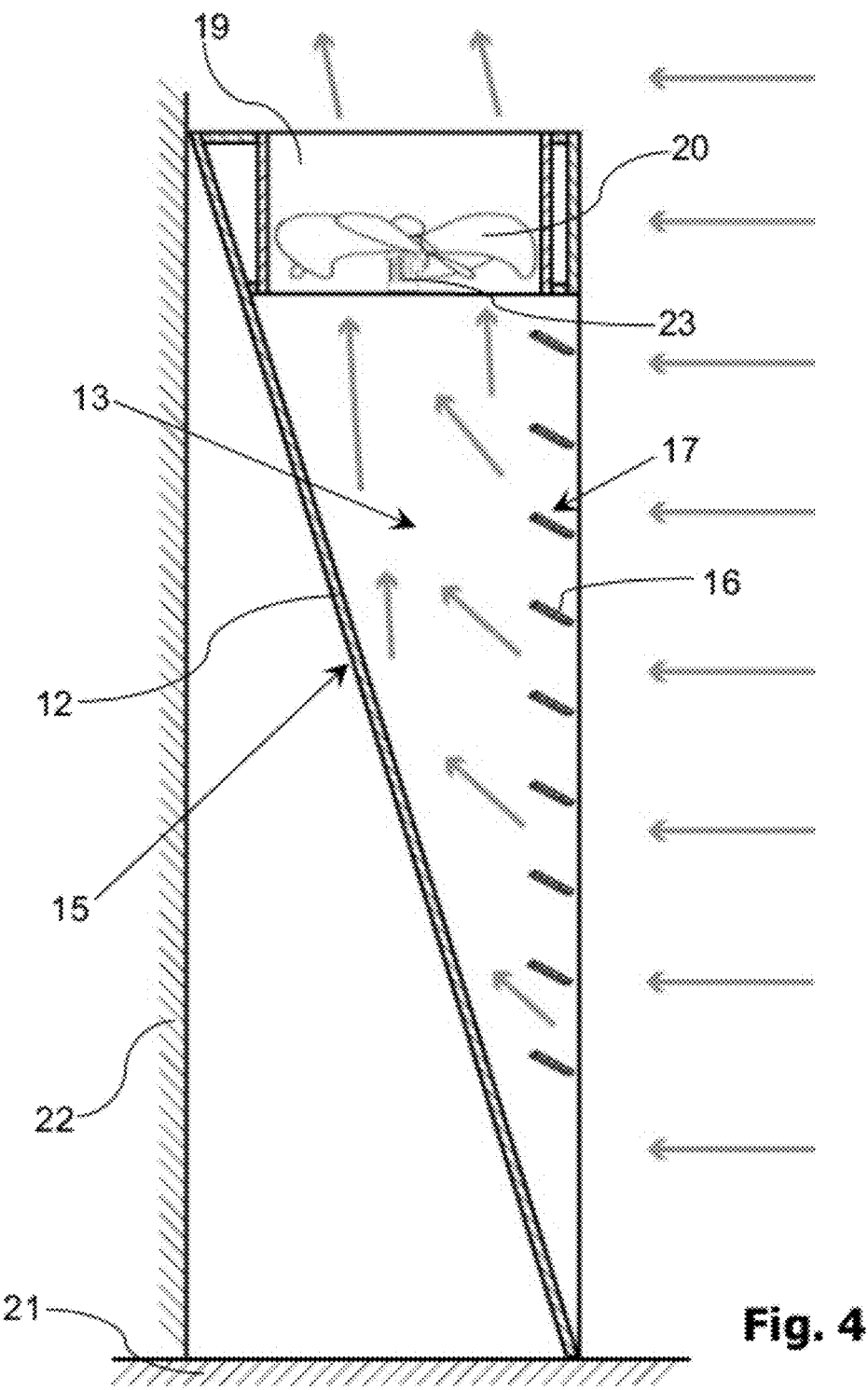
FIG. 4 is a view showing vertical cross-section of the inventive apparatus shown in FIGS. 2 and 3, which is supported on a wall, and direction of a wind flowing through its interior.

FIG. 4 shows a vertical cross-section of the inventive apparatus shown in FIG. 3 with a further embodiment of the present invention. Here, the apparatus, for example such as shown in FIG. 3 is associated with a wall. More particularly its lower end is supported on a horizontal surface 21 and its upper end abuts against a vertical wall 22. The wind acting on the apparatus arranged in this way is first directed by the additional inclined wind guiding elements 17 into the interior of the apparatus and then directed by the wind directing elements 13 towards the main wind guiding element 15 which guides the wind upwardly toward the turbine 19 to rotate its impeller 20 which is connected, in a not shown manner, with a shaft of an electricity generator 23 which can be placed directly under the impeller 20, inside the impeller 20, or in other locations inside of the inventive apparatus.

Figure 5:
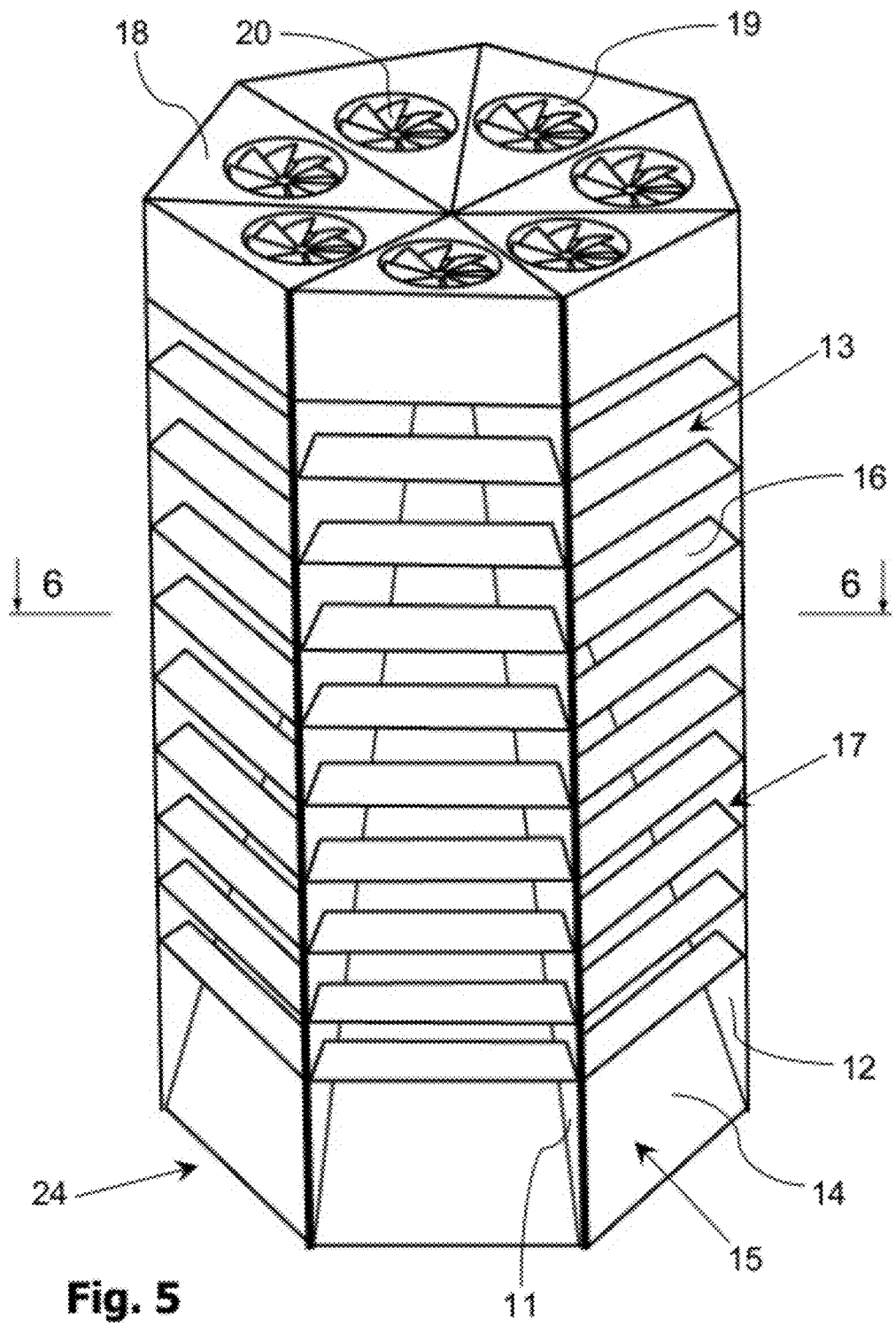
FIG. 5 is a view showing an inventive apparatus which has a multi-side shape and composed of a plurality of individual units such as shown for example in FIG. 3.

FIG. 5 shows a further embodiment of the present invention. Here the apparatus is composed of a plurality of individual units 24 each formed for example as the apparatus shown in FIG. 3. Each unit of this multi-unit apparatus has the walls 11, 12 and 14 with side walls 11 and 12 forming the wind directing elements 13, and with the inclined walls 14 forming the main wind guiding elements 15, the plurality of plates 16 forming additional inclined wind guiding elements 17, and the turbine 19 arranged in the upper wall 18. Each unit 24 forms an individual wind channel associated with its individual turbine 19. When the units 24 are connected with one another, a plurality of wind channels are formed and spaced from one another in a peripheral direction about a vertical axis. As a result, regardless of wind direction, wind always "finds" at least one unit 24 and its wind channel to be directed upwardly to the corresponding turbine 19 to rotate its impeller 20.

Figure 6:
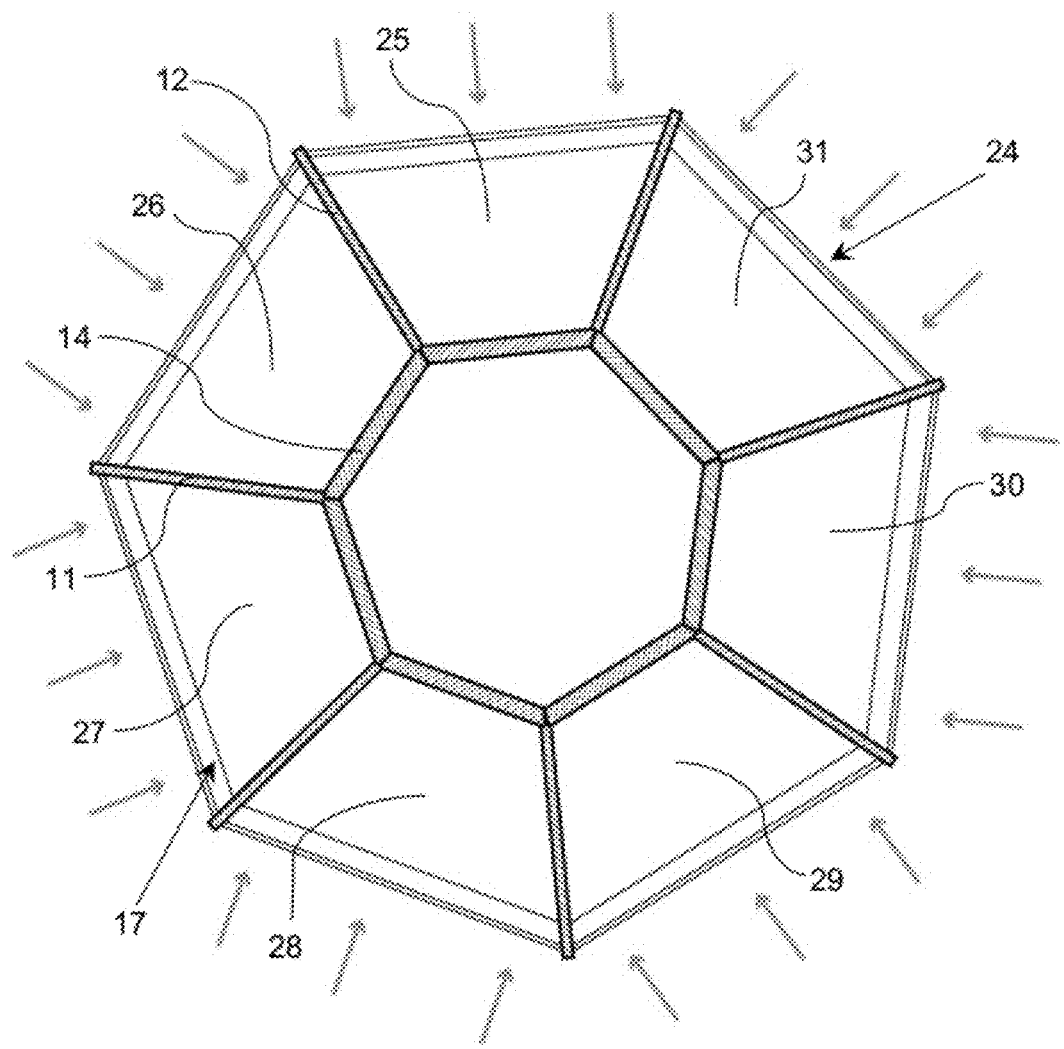
FIG. 6 is a view showing a horizontal cross-section of the inventive apparatus shown in FIG. 5.

FIG. 6 shows a horizontal cross-section of the multi-unit apparatus shown in FIG. 5 with shown wind directing elements 11 and 12, the main wind guiding elements 14, and the additional inclined wind guiding elements 17. As can be seen from FIG. 6, the units 24 form a plurality of wind channels 25, 26, 27, 28, 29, 30, 31. The units 24 can be also connected by known means, such as by gluing, welding, soldering, bolting or made of one piece with one another from a one-piece material. The number of units can vary, and the multi-unit apparatus shown in FIGS. 5 and 6 is only an example of limitless variations. It is believed that it is possible that the multi-unit apparatus has also other cross-sections, which are different from the cross-sections shown in FIG. 6.

Figure 7:
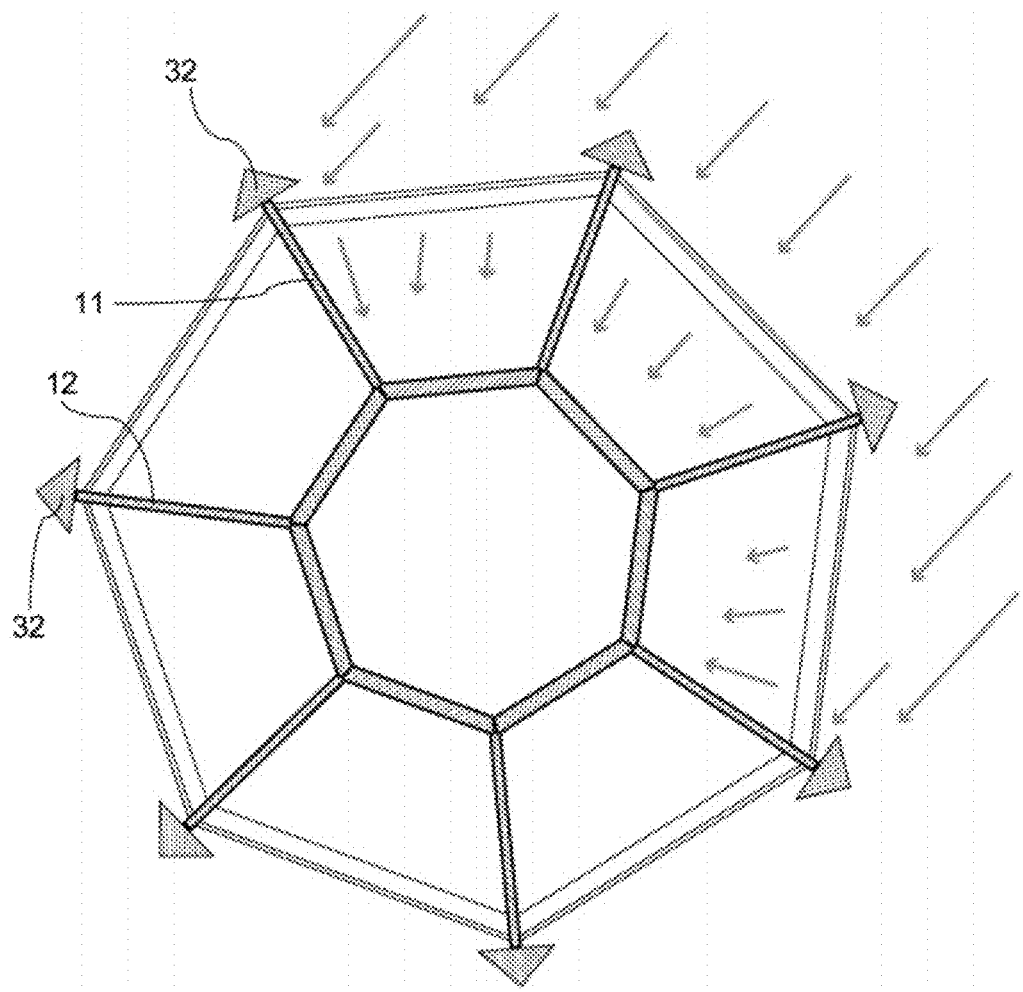
FIG. 7 shows an apparatus shown in FIG. 6, with an example of additional wind directing elements.

FIG. 7 shows an apparatus that substantially corresponds to the apparatus shown in FIG. 6, with example of additional wind directing elements 32 attached to the substantially upright side walls 11 and 12 in order to increase the amount of electricity produced by this multi-unit inventive apparatus. These additional wind directing elements 32 direct the wind that collides with edges of this multi-unit apparatus inside towards the wind channels, thus "catching" greater amounts of wind colliding with the apparatus, therefore producing greater amounts of energy.

Figure 8:
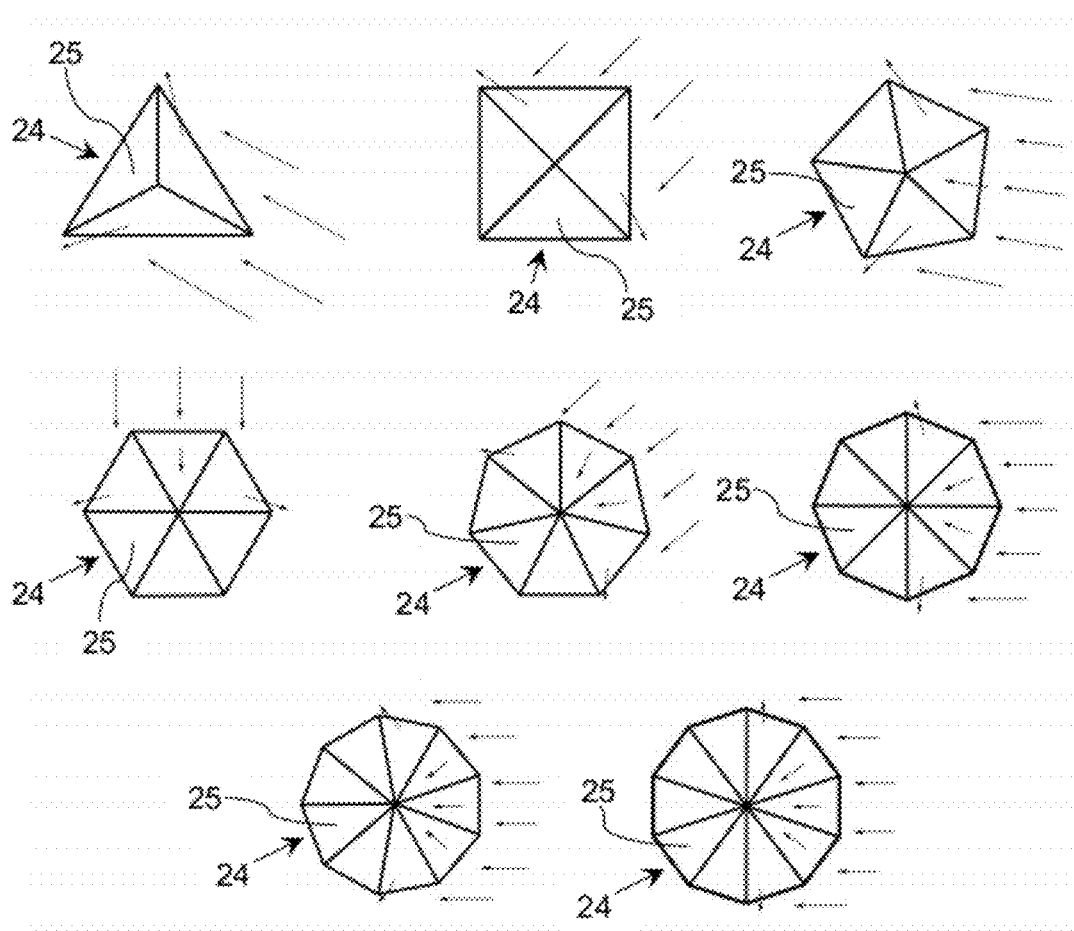
FIG. 8 is a schematic view showing examples of possible pluralities of individual units of the inventive apparatus such as shown for example in FIG. 3 and their wind channels.

FIG. 8 shows schematic examples of possible pluralities of units 24 and their corresponding wind channels 25 of the multi-unit apparatus for generating electricity from wind power. Plurality of individual units 24 can vary, however, if there are seven or more units 24 in this embodiment, regardless of wind direction, wind is efficiently directed into wind channels of at least two units 24, therefore increasing the width of "working surface" of the multi-unit apparatus regardless of wind direction and "catching" greater amounts of wind and its energy.

Figure 9:
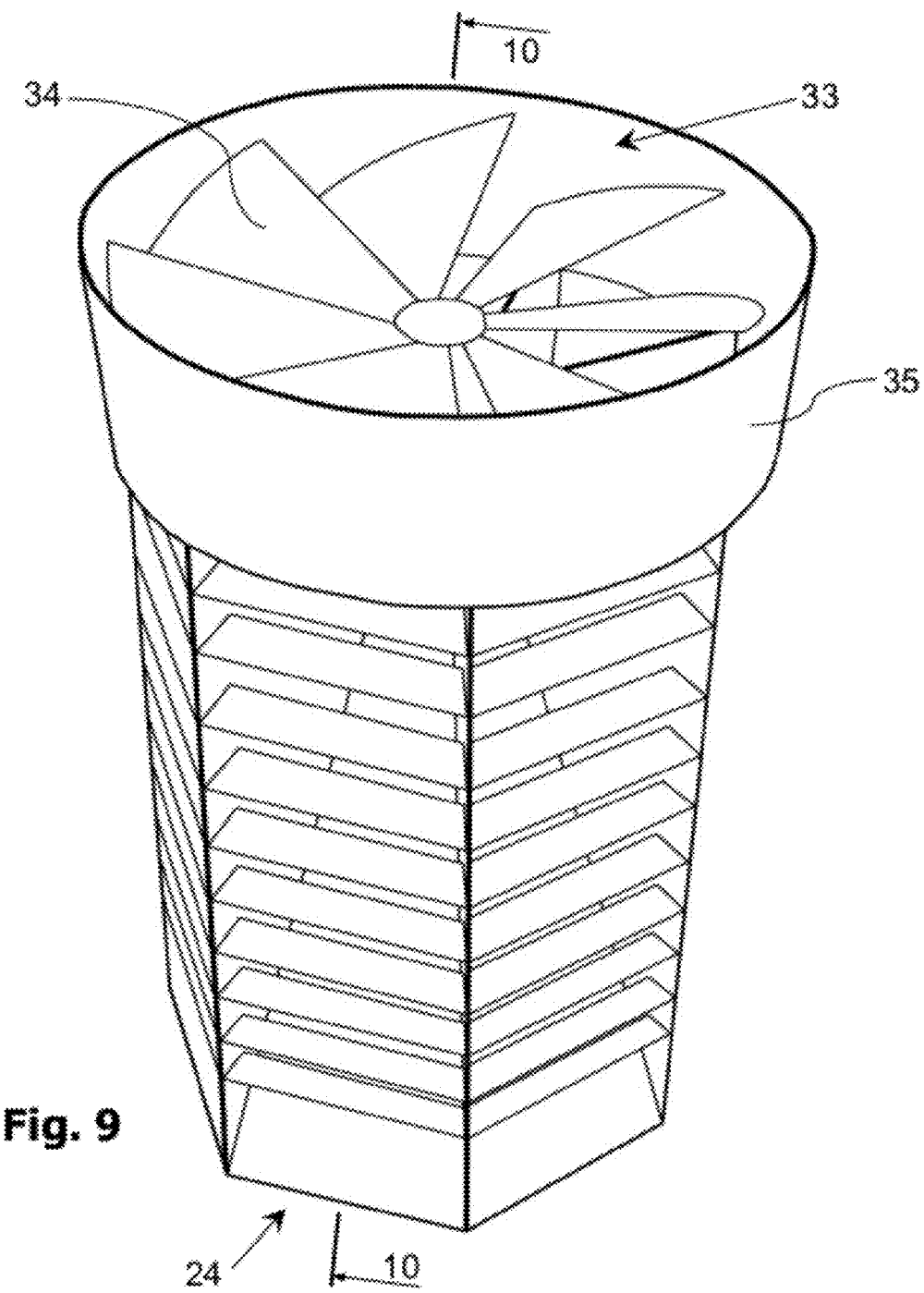
FIG. 9 is a perspective view of the inventive apparatus in accordance with still a further embodiment of the present invention.

FIG. 9 shows a further embodiment of the inventive apparatus. The apparatus is also composed of a plurality of individual units 24 and thereby form a plurality of individual wind channels. However, in contrast to the multi-unit apparatus shown in FIG. 5, the multi-unit apparatus shown in FIG. 9 has a single turbine 33 with a single impeller 34 associated with all wind channels of the multi-unit apparatus shown in FIG. 9. The wind emerging from the individual wind channels acts on the impeller blades of the single turbine 33. A casing 35 surrounds the turbine 33.

Figure 10:
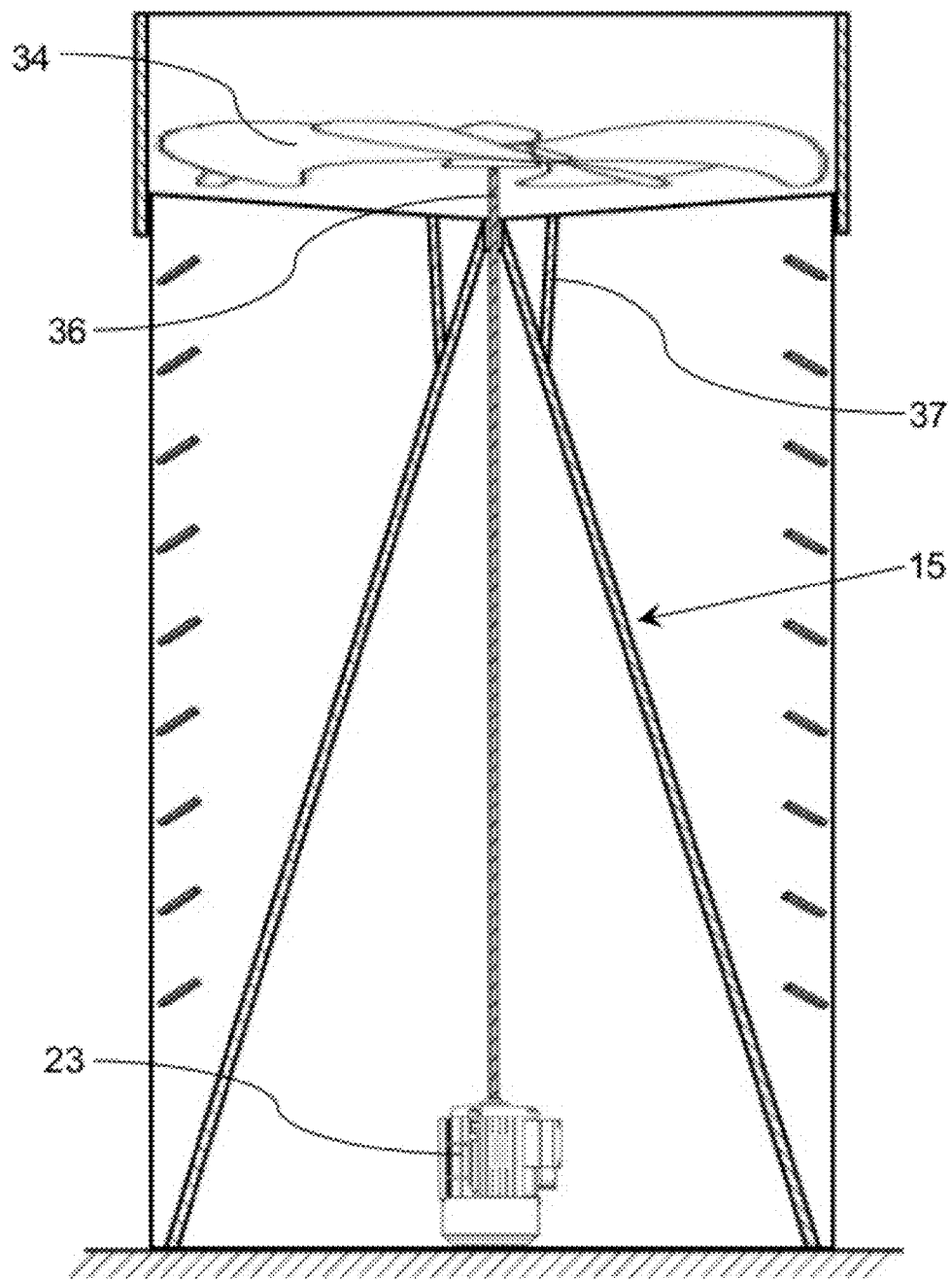
FIG. 10 is a view showing a vertical cross-section of the inventive apparatus shown in FIG. 9.

FIG. 10 shows a vertical cross-section of the multi-unit apparatus shown in FIG. 9. A shaft 36 of the turbine's impeller 34 is connected with a shaft of a generator 23. When the impeller 34 is rotated under the action of wind, the shaft of the generator 23 is rotated as well, and the generator 23 generates electricity, which can be used for any desired purposes. The generator 23 can be located at any level inside the apparatus, including the top or the bottom. In an upper part of the apparatus an upper guiding elements 37 of the main wind guiding elements 15 are either vertical or inclined in opposite directions, substantially radially outwardly, so as to direct the wind to the blades of the turbine's impeller, instead of the inner part of the turbine adjacent to its shaft. This upper guiding element 37 increases the efficiency of rotation of the turbine's impeller.

Figure 11:
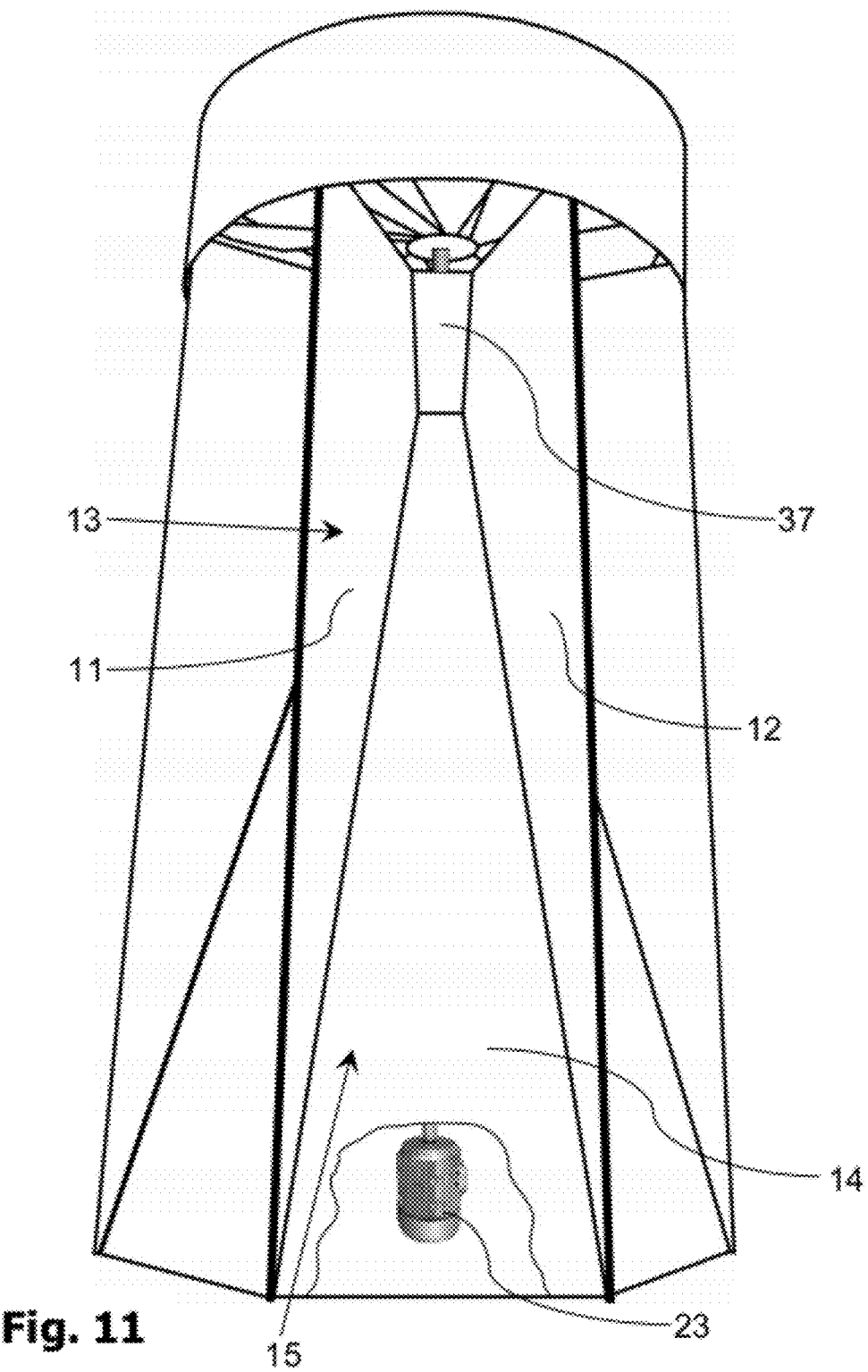
FIG. 11 is a perspective view of the inventive apparatus in accordance with a further embodiment of the present invention.

FIG. 11 shows an apparatus that substantially corresponds to the multi-unit apparatus shown in FIG. 9. However, in contrast to the multi-unit apparatus shown in FIG. 9, the multi-unit apparatus shown in FIG. 11 has no additional inclined wind guiding elements, and in accordance with the present invention the apparatus has only wind directing elements 13 formed by walls 11 and 12, and the main wind guiding elements 15 formed by walls 14 which are inclined to a vertical plane and the upper guiding elements 37 which are vertical or inclined substantially radially outwardly. FIG. 11 also shows the electricity generator 23 that is connected with the turbine's impeller and arranged at the base of the apparatus as a convenient location for a generator to be serviced if the inventive apparatus is a tall structure, and it is only an example of possible generator's location.

Figures 12, 13, 14:
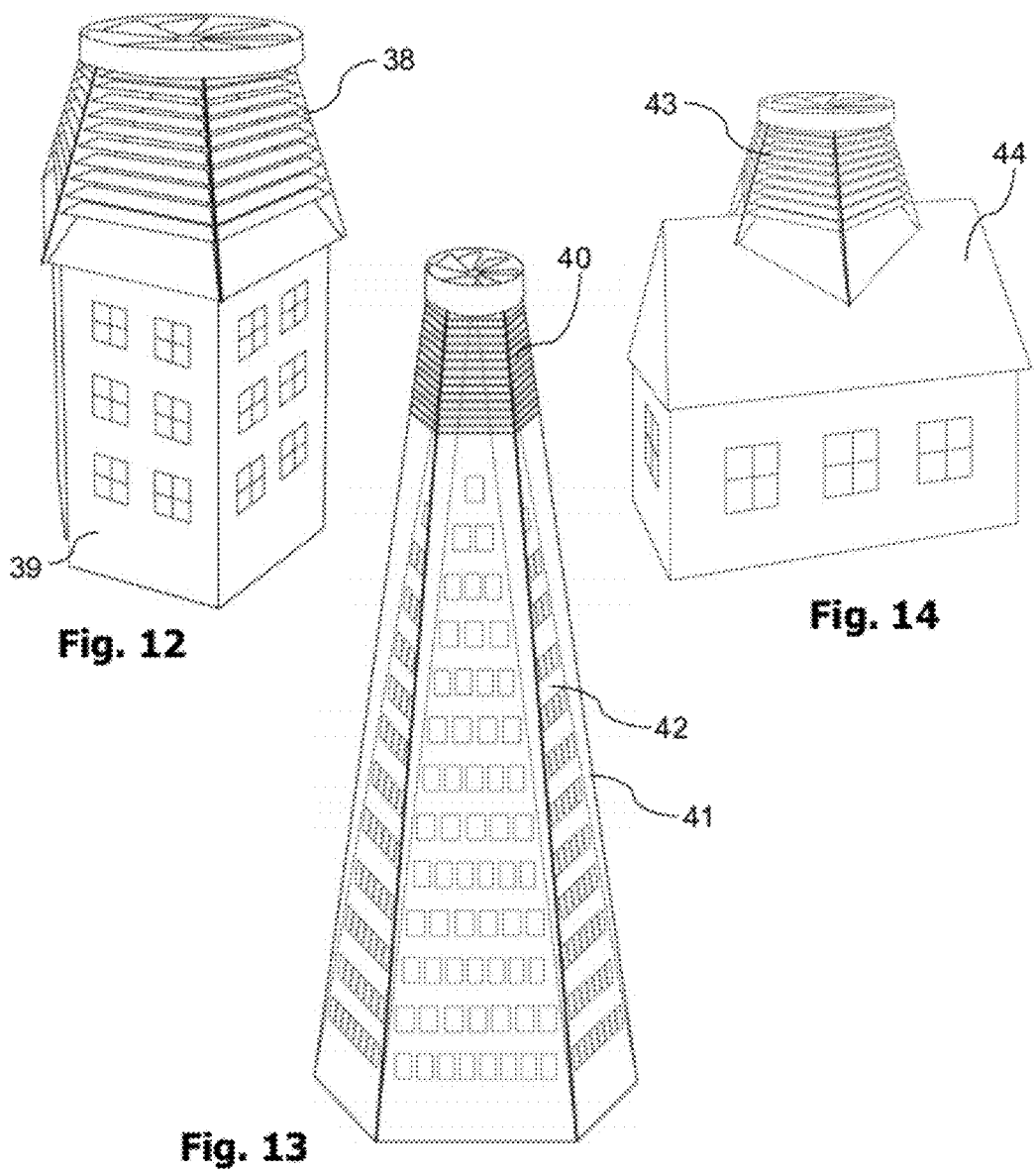
FIGS. 12, 13 and 14 are views showing the inventive apparatus arranged on a house or a building.

FIGS. 12, 13, and 14 show examples of the inventive multi-unit apparatus associated with buildings or houses. In FIG. 12 an apparatus 38 in accordance with the present invention forms a roof of a building 39. FIG. 13 in accordance with the present invention shows an apparatus 40 as an at least partial exterior and a roof of a building 41, where building's walls 42 function as main wind guiding elements. As a structure that is hollow inside, such multi-unit apparatus 40 in accordance with the present invention can also be used as a water tower on a ground or on a roof where walls of the water tower function as main wind guiding elements. As an independent power source, the inventive apparatus if used in conjunction with a water pump, can independently collect, store, and distribute the water from a water well. In FIG. 14 an apparatus 43 is arranged on a roof of a house 44 or forms a part of it. As these examples show, the invented apparatus can be attached to or be a part of many types of structures not limited to examples shown.

Figure 15:
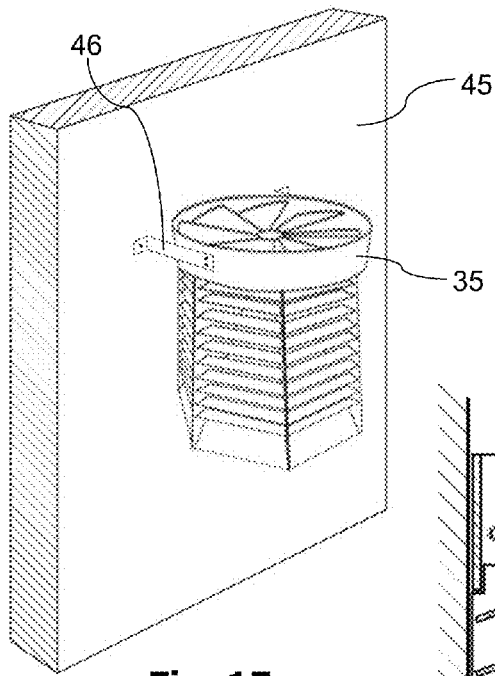
FIG. 15 is a view showing the inventive apparatus attached to a wall.

FIG. 15 shows the multi-unit apparatus in accordance with the present invention, for example the apparatus as shown in FIG. 9, which is attached to a vertical wall 45. As an example of ways of attaching the apparatus to the wall, fastening straps 46 are connected to the casing 35 by bolts on their first ends and are connected to the wall 45 by their other ends, for example by bolts, etc. The wind acting from three directions, namely from a front, a left side and a right side of the apparatus and rotates the turbine's impeller.

Figure 16:
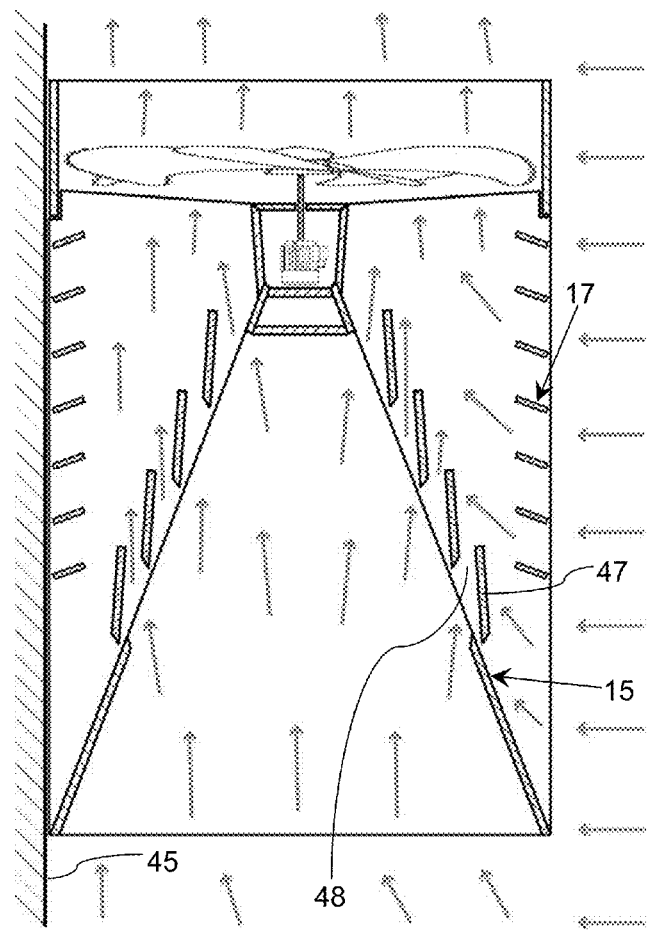
FIG. 16 is a view showing a vertical cross-section of the inventive apparatus shown in FIG. 15.

FIG. 16 shows a vertical cross-section of the apparatus shown in FIG. 15. Additionally to the elements described herein below, this apparatus's main wind guiding element 15 is at least partially consists of plurality of plates forming substantially upwardly inclined further wind guiding elements 47 formed between openings 48, that are similarly to the additional wind guiding elements 17, extend between substantially upright side walls. As can be seen from this Figure, this main wind guiding element consisting of plurality of substantially upwardly inclined further wind guiding elements 47 and openings 48 between them, in accordance with the present invention redirects the wind entering the apparatus from its sides upwardly, while allowing the wind entering the apparatus from its bottom to be directed through the openings 48 also upwardly toward the turbine. This embodiment allows to collect energy of wind that is redirected upwardly by the building's wall 45.

Figure 17:
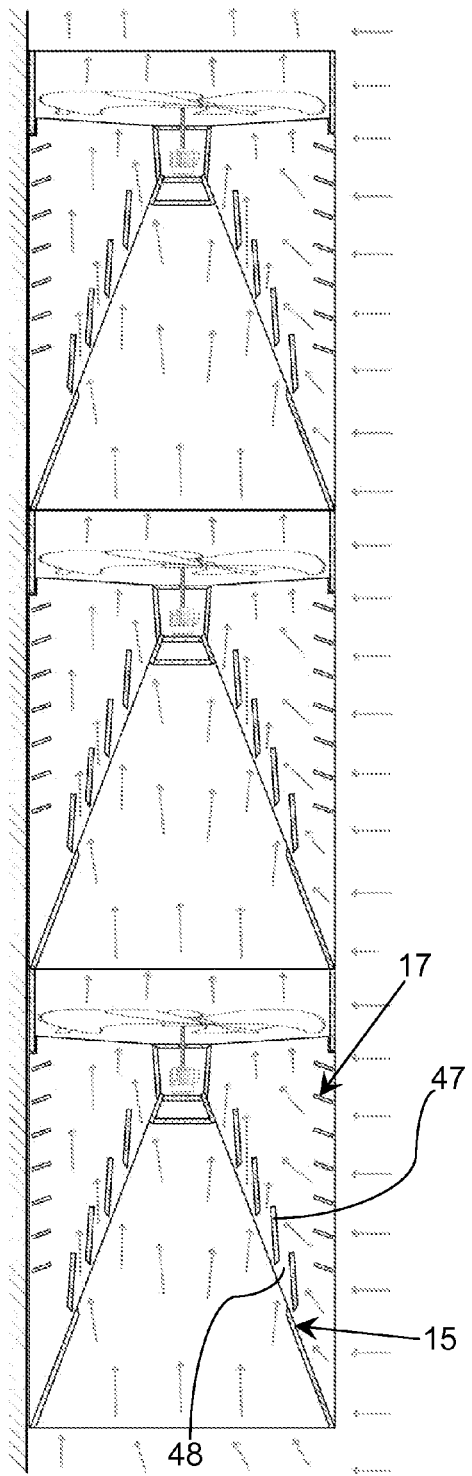
FIG. 17 is a view showing an inventive apparatus which is composed of a plurality of units shown in FIG. 16 that are vertically placed one on top of another, and attached to a wall.

As can be seen from FIG. 17 the inventive apparatus can be composed of a plurality of multi-unit apparatuses each formed as shown in FIGS. 15, 16 and arranged over one another in a vertical direction, while adjacent to a wall. The wind blowing from sides and upwardly through the bottom of the apparatus is directed upwardly by the additional guiding elements 17 and the main wind guiding elements 15 formed by further substantially upwardly guiding elements 47 and openings 48 through wind channels then through the turbine into the same apparatus mounted vertically on top, through its openings 48 into its wind channels and into its turbine. This vertical arrangement creates a narrow vertical tower, that can be of any height, may consist of any multiple number of inventive apparatuses arranged one on top of the other that collect energy of wind blowing from all sides, upwardly from below, and upwardly from the apparatuses below.

Figure 18:
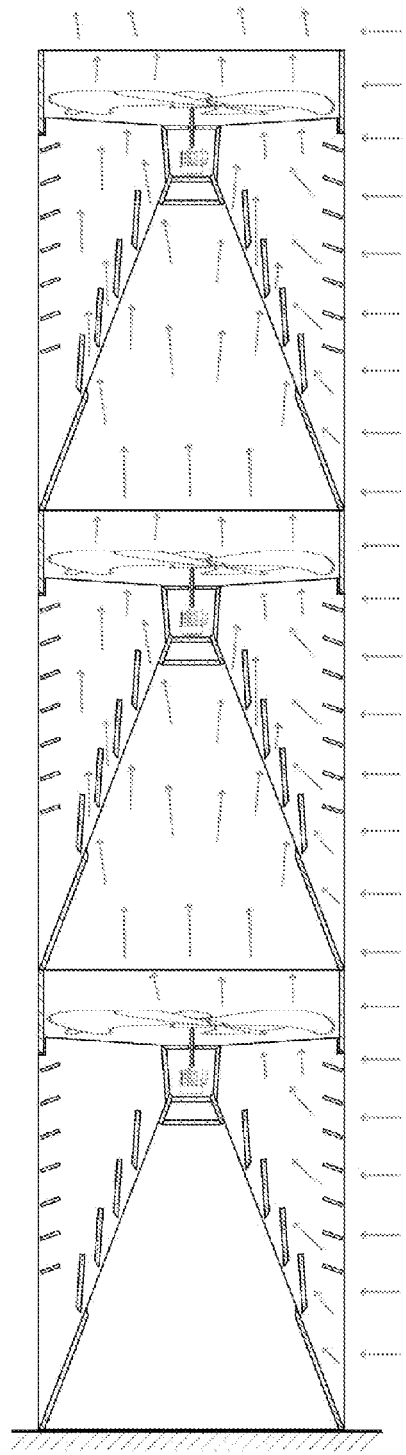
FIG. 18 is a view substantially corresponding to the view of FIG. 17 but showing a plurality of vertically placed one on top of another apparatuses, freely—standing on a horizontal surface.

FIG. 18 substantially corresponds to the apparatus shown in FIG. 17 where invented apparatuses are also arranged one over another, and are free-standing, not associated with the wall.

Figure 19:
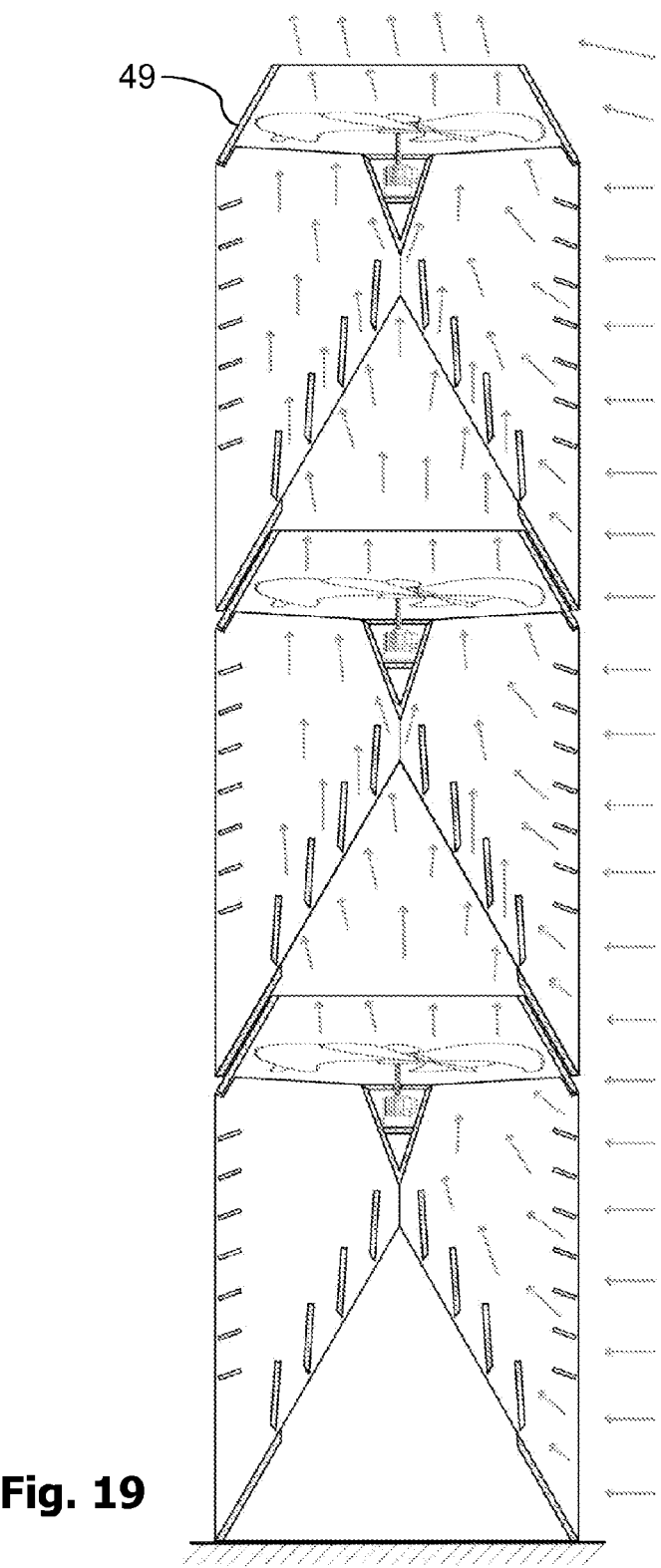
FIG. 19 is a view substantially corresponding to the view of FIG. 18 with further embodiment of the present invention.

FIG. 19 shows an example of apparatus shown in FIGS. 17 and 18 in accordance with the present invention with a modified shape of a turbine's casing 49 in order to allow firmer connection between arranged vertically together one over another inventive apparatuses, greater stability and greater efficiency to produce more electrical power. As a structure in a form of a tower with very rigid and stable design, such apparatus as shown for example in FIG. 19 can be of any height and width, therefore can be applied in many applications, for example as a supporting or non-supporting column, or an electrical pole. It can also be a very tall stand-alone tower-like structure with a very small footprint, and supported by cables to the ground.

Figure 20:
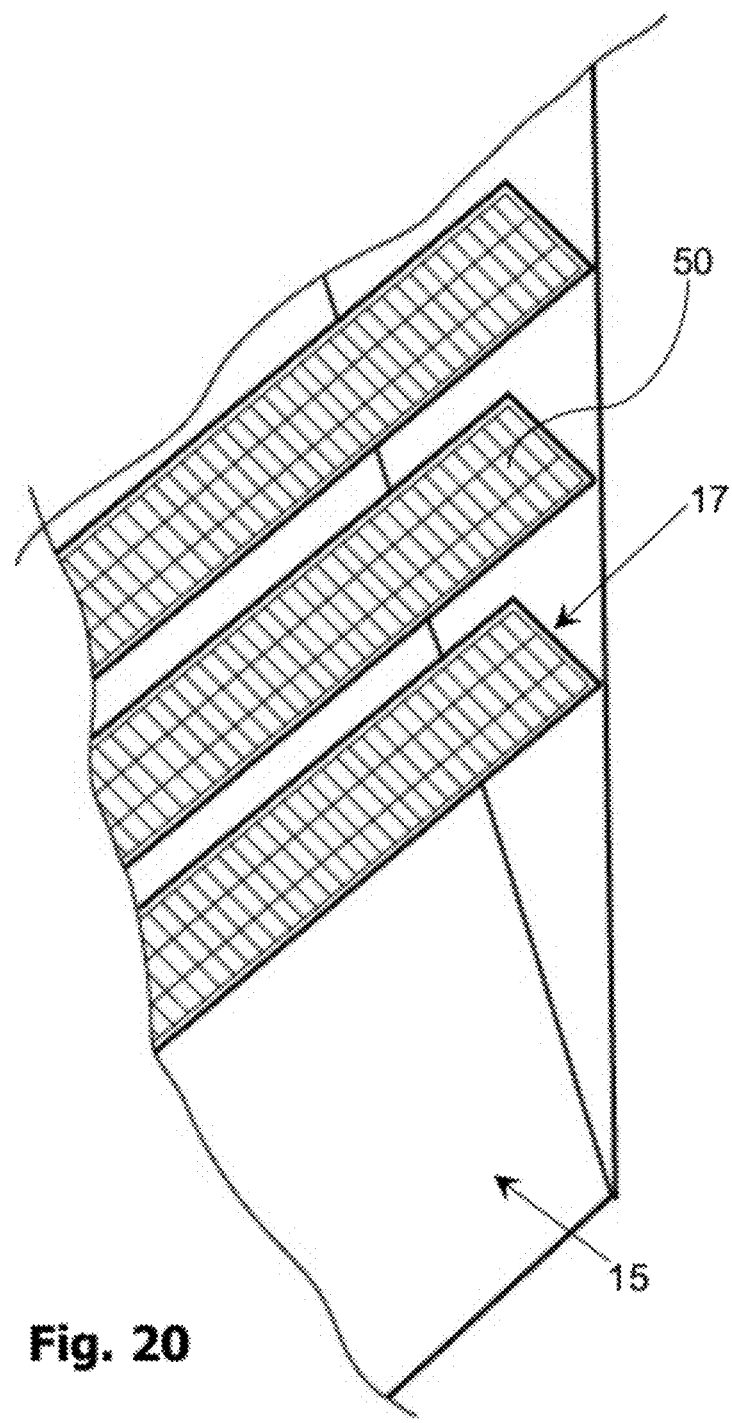
FIG. 20 is a view showing a few additional inclined wind-guiding elements of the inventive apparatus provided with solar cells.

FIG. 20 shows that the apparatus in accordance with the present invention can also use solar energy to generate electricity. In particular, the additional wind guiding elements 17 of the apparatus can be provided with solar panels 50, which form a part of solar cells. When solar energy acts on the solar panels 50, the solar cells generate electricity, thus providing an additional quantity of generated electricity. If arranged on additional wind guiding elements of multiple units 23 such as shown in FIGS. 5 and 9, solar panels can generate electricity with any position of the Sun, therefore during the entire course of the day.

Figure 21:
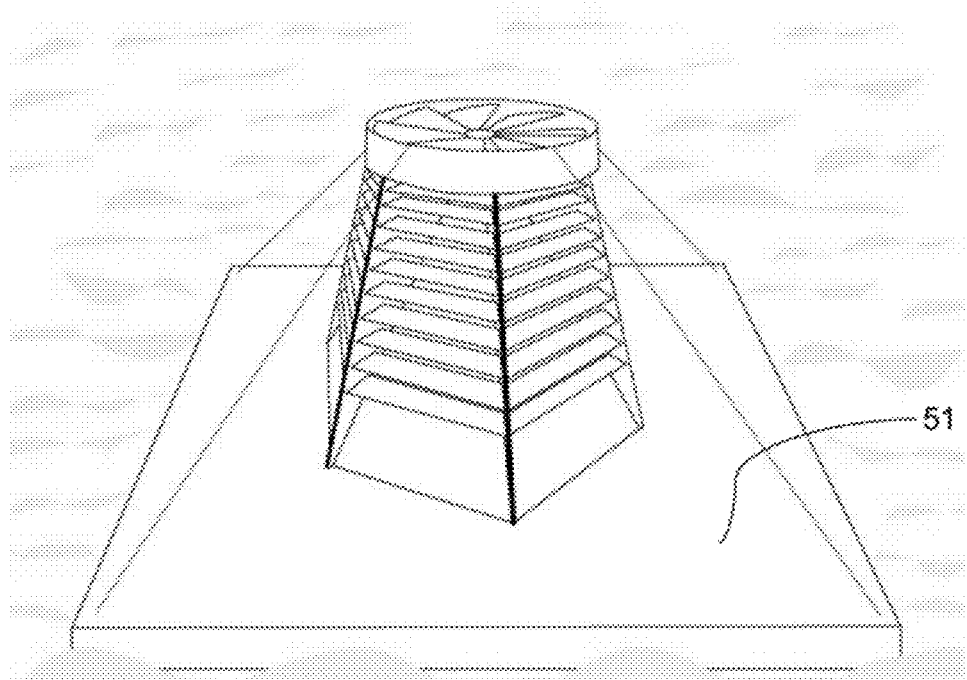
FIGS. 21 and 22 are views showing the inventive apparatus arranged on a floating platform and on a ship.

As shown in FIG. 21 the inventive apparatus can be mounted on a floating platform 51 and connected with it by known means such as gluing, welding, bolting, etc. As a light and stable floating structure, it can be moved anywhere at any time on the ocean surface. It is significantly less expensive to produce and service in comparison to other wind technologies including turbines that are mounted to a bottom of the ocean to sustain strong waves and winds, as well as mooring technology for floating offshore wind turbines. The inventive multi-unit apparatus mounted on a floating platform can be used in conjunction with technologies installed inside or outside of the apparatus that collect electricity from energy of ocean waves. Moreover, an energy collector can be installed inside the apparatus. As a structure with a large hollow interior that can be waterproofed, this multi-unit apparatus in accordance with the present invention can also become a lighthouse, a laboratory, a charging station for passing-by electric power boats, a house on water, etc.

Figure 22:
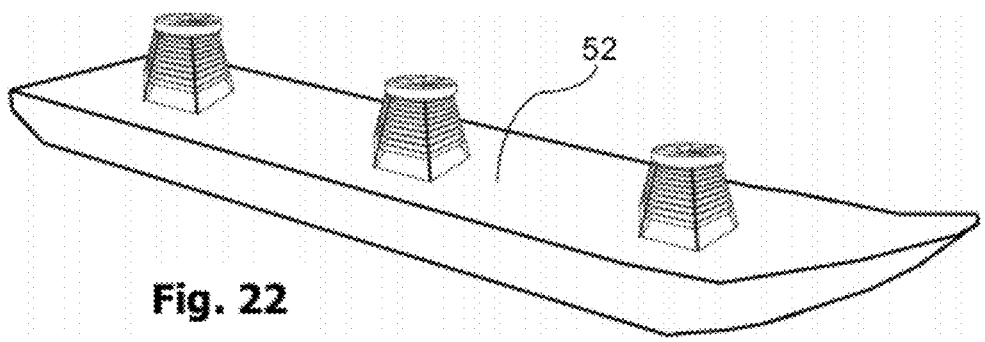

As shown in FIG. 22 the inventive apparatus can be arranged on a ship 52. This example shows how inventive apparatus will work as a new type of "sail" that will transform energy of wind hitting this "sail" into electricity that can power the ship's thrust and all other electric power necessities on the ship.

Figures 23, 24:
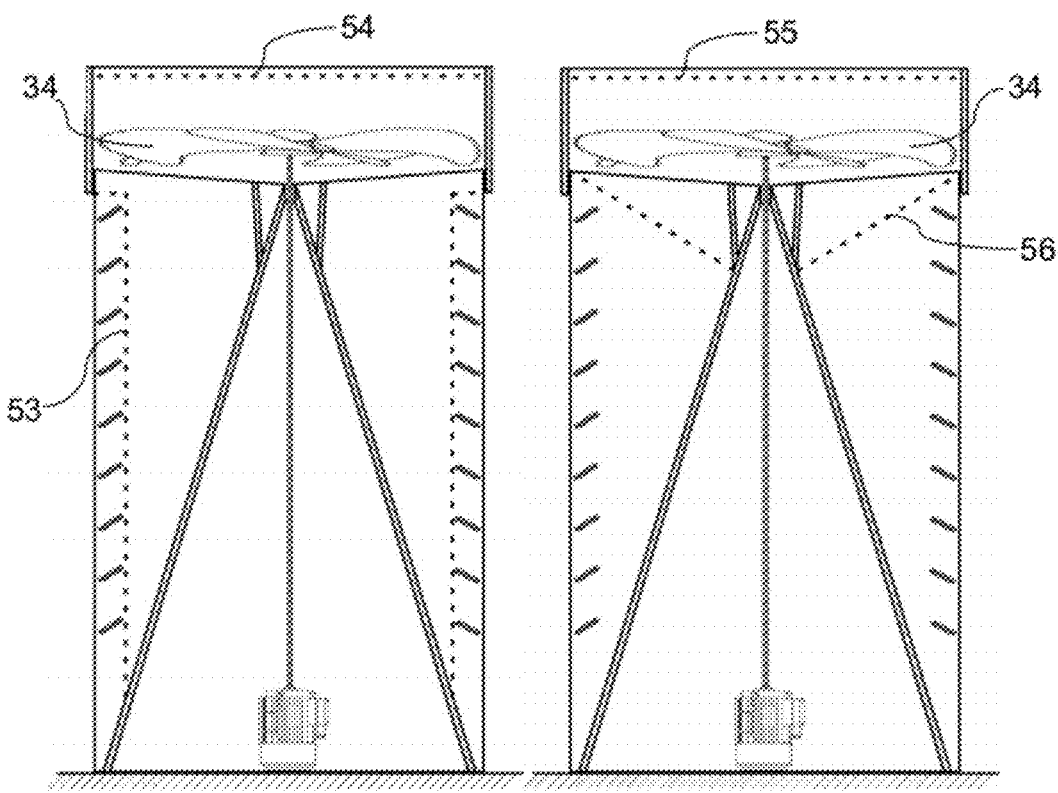
FIGS. 23 and 24 are views showing a vertical cross-section of the inventive apparatus shown in FIG. 9, with a bird-protecting element.

As shown in FIGS. 23 and 24, a grid of a bird-protecting element 53, 54, 55, 56 can be attached above and below the turbine's impeller 34 to block birds and other wildlife from getting into the potentially dangerous turbine's impeller 34. It can be made of any solid material, as a wire mesh or a net, with openings that are large enough not to affect the windflow, and small enough to restrict birds or other wildlife from getting inside of the apparatus.

Figure 25:
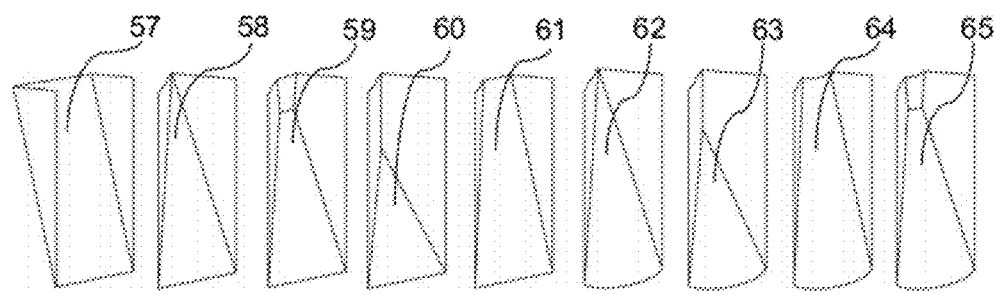
FIGS. 25, 26 and 27 are views showing examples of potential variations of certain elements of the inventive apparatus.
Figure 26:
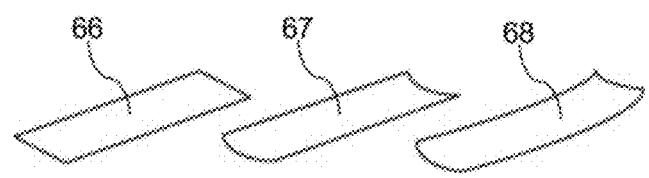
Figure 27:
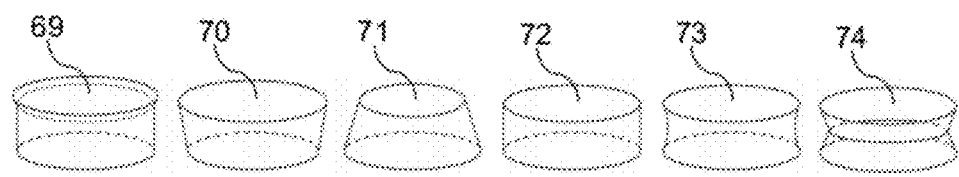

FIGS. 25, 26 and 27 show examples of potential variations of certain elements of the inventive apparatus. FIG. 25 in accordance with the present invention shows examples of shape variations of a main wind-guiding element 57, 58, 59, 60, 61, 62, 63, 64, 65 that can be flat, curved, consisting of more than one plane, in a form of a rectangle, a triangle, or a trapezoid. The main wind guiding element can be the height of the entire inventive apparatus or less than the height of the entire inventive apparatus. FIG. 26 in accordance with the present invention shows examples of shape variations of additional inclined wind guiding elements 66, 67, 68 that can be flat or curved, can be of any size and thickness. The distance between any two additional inclined wind-guiding elements can vary. Additional inclined wind guiding elements can also be made operable to change their angle to a horizontal plane in order to control the wind flow into the interior of the inventive apparatus. FIG. 27 in accordance with the present invention shows examples of shape variations of turbine's casings 69, 70, 71, 72, 73, 74. Variations of shapes shown in FIGS. 25, 26 and 27 are not limited to said examples and can be applied depending on where and how the inventive apparatus will be used, to improve its efficiency, to improve its aerodynamics and stability, to decrease potential wind turbulence and noise, or to make it a part of another structure.

It will be understood that each of the elements described above, or two or more together, may also find a useful application in other types of constructions differing from the type described above.

While the invention has been illustrated and described as embodied in an apparatus for generating electricity from wind power, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for generating electricity from wind power, consisting of a turbine having an impeller rotatable about a substantially vertical axis; a generator connected with said turbine and generating electricity in response to rotation of said impeller about the substantially vertical axis under an action of wind; and a wind guiding device which guides wind substantially upwardly toward said turbine, wherein said wind guiding device has a main wind guiding element which is located under said impeller of said turbine, is inclined relative to a vertical plane and directs the wind from below upwardly toward said impeller of said turbine rotatable about the substantially vertical axis, wherein said main wind guiding element is a single one-piece element which is inclined relative to a vertical plane, has a lower end and upper end, and extends in its entirety uninterruptedly from said lower end to said upper end, and also from a lower end of the whole apparatus up to a bottom of the turbine, so that the wind is guided from below upwardly over and along said single one piece inclined element from said lower end to said upper end of said element and from said lower end of the whole apparatus up to said bottom of the turbine uninterruptedly, and wherein said wind guiding device is open at one side opposite to said uninterrupted, one-piece inclined wind guiding element over a whole height of the latter so that wind flows from outside onto said uninterrupted, one-piece inclined wind guiding element over its whole height and is guided upwardly.

2. An apparatus as defined in claim 1; further comprising at least one substantially vertical uninterrupted one-piece wind directing element located at least at one side of said main wind guiding element, and forming together with said main wind guiding element a unit.

3. An apparatus as defined in claim 2; further comprising a plurality of such units arranged adjacent to one another in a peripheral direction around a vertical axis over a whole circumference adjacent to one another and in abutment with one another, so as to allow the wind to enter said apparatus from all sides and to be directed upwardly.

4. An apparatus as defined in claim 3, wherein said units form a plurality of vertical wind channels spaced circumferentially from one another, said impeller is a single impeller of said turbine rotatable about the substantially vertical axis and being associated with all said vertical wind channels of all said units.

5. An apparatus as defined in claim 2, wherein said unit has another substantially vertical uninterrupted one-piece wind directing element located at opposite side of said uninterrupted, one-piece inclined main wind guiding element, so that each of said units includes said inclined main wind guiding element and said two substantially vertical uninterrupted one-piece wind directing elements located at its both sides.

6. An apparatus as defined in claim 2, wherein said substantially vertical uninterrupted one-piece wind directing element is substantially flat.

7. An apparatus as defined in claim 3, wherein said units form a plurality of vertical wind channels spaced circumferentially from one another, further comprising a plurality of said turbines having said impellers rotatable about the substantially vertical axes arranged so that each of said turbines is associated with a respective one of said vertical channels of a respective one of said units.

8. An apparatus as defined in claim 3, wherein said apparatus in its entirety forms an element selected from the group consisting of a roof, a part of a roof, and at least a partial exterior of an occupyable structure selected from the group including a building, a house, and a water tower.

9. An apparatus as defined in claim 3, further comprising a structure selected from the group consisting of a floatable platform and a ship, and means for attaching a lower side of the apparatus to said floatable platform or said ship as a source of electrical power and thrust for said floatable platform or said ship.

10. An apparatus as defined in claim 3, wherein said apparatus has a bird-protecting element.

11. An apparatus as defined in claim 3, further comprising additional uninterrupted, one-piece inclined wind guiding elements which surround said uninterrupted, one-piece inclined main wind guiding element over a whole circumference uninterruptedly around a vertical axis.

12. An apparatus as defined in claim 1, wherein said uninterrupted, one-piece inclined main wind guiding element has an outer surface which is inclined relative to the vertical plane from said lower end to said upper end in its entirety and thereby wind is guided over said inclined in its entirety outer surface from said lower end to said upper end.

13. An apparatus as defined in claim 1; further comprising a plurality of identical plates which are spaced from one another in a substantially upright direction and inclined to a horizontal plane so as to form additional inclined wind guiding elements for guiding the wind upwardly into a wind channel, formed by said wind directing elements and said uninterrupted, one-piece inclined main wind guiding element, towards said impeller of said turbine rotatable about the substantially vertical axis, wherein said additional guiding elements which are inclined to the horizontal plane are located horizontally outwardly of said uninterrupted, one-piece main wind guiding element which is inclined relative to a vertical plane and direct the wind from outside inwardly toward said uninterrupted, one-piece inclined main wind guiding element.

14. An apparatus as defined in claim 13, wherein said identical plates are plates selected from the group consisting of plates provided with solar panels forming parts of solar cells, and plates without solar panels.

15. An apparatus as defined in claim 1, wherein said uninterrupted, one-piece inclined main wind guiding element with said lower end is supportable on a horizontal surface and with said upper end is abutable against a vertical wall, so that said apparatus can be installed in abutment with the vertical wall.

16. An apparatus as defined in claim 1, wherein said apparatus has means for attaching said apparatus to a wall and including a plurality of attaching elements having first ends connectable to said apparatus and second ends connectable to the wall.

17. An apparatus as defined in claim 1, wherein said inclined in its entirety from said lower end to said upper end main wind guiding element has a plurality of openings and a plurality of further substantially upwardly guiding elements associated with said openings, so that wind entering said apparatus from below is directed upwardly through said openings toward said impeller of said turbine rotatable about the substantially vertical axis.

18. An apparatus as defined in claim 17, further comprising a plurality of said apparatuses arranged over one another in a vertical direction in a position selected from a group consisting of adjacent to a wall and free-standing.

19. An apparatus as defined in claim 1, wherein said wind guiding device has two further wind guiding elements which are substantially vertical and located at two further sides, so that said wind guiding device consists exclusively of said main wind guiding element at said first side and said two further vertical wind guiding elements at two further sides, with all said wind guiding elements extending in their entirety uninterruptedly from said lower end to said upper end of the wind guiding device and from a lower end of the apparatus to a bottom of the turbine, and said turbine is located relative to said main wind guiding element at an open side of said wind guiding device and inside a space limited by said inclined main wind guiding element and said two vertical further wind guiding elements.

20. An apparatus as defined in claim 19, wherein each of said wind guiding elements of said wind guiding device is an uninterrupted, one-piece element.

\* \* \* \* \*